(12) United States Patent
Hermoni et al.

(10) Patent No.: US 11,568,280 B1
(45) Date of Patent: Jan. 31, 2023

(54) SYSTEM, METHOD, AND COMPUTER PROGRAM FOR PARENTAL CONTROLS AND RECOMMENDATIONS BASED ON ARTIFICIAL INTELLIGENCE

(71) Applicant: Amdocs Development Limited, Limassol (CY)

(72) Inventors: Ofer Hermoni, Tenafly, NJ (US); Eyal Felstaine, Herzliya (IL)

(73) Assignee: AMDOCS DEVELOPMENT LIMITED, Limassol (CY)

( * ) Notice: Subject to any disclaimer, the term of this patent is extended or adjusted under 35 U.S.C. 154(b) by 1045 days.

(21) Appl. No.: 16/255,609

(22) Filed: Jan. 23, 2019

(51) Int. Cl.
*G06N 5/04* (2006.01)
*G06F 16/435* (2019.01)
*G06N 20/00* (2019.01)

(52) U.S. Cl.
CPC .............. *G06N 5/04* (2013.01); *G06F 16/437* (2019.01); *G06N 20/00* (2019.01)

(58) Field of Classification Search
CPC ......... G06N 5/04; G06N 20/00; G06F 16/437
USPC .......................................................... 706/12
See application file for complete search history.

(56) References Cited

U.S. PATENT DOCUMENTS

| | | | | |
|---|---|---|---|---|
| 9,766,856 B2* | 9/2017 | Yehaskel | ............ | G06F 16/9535 |
| 9,819,610 B1* | 11/2017 | Crump | ................. | G06V 40/172 |
| 10,013,488 B1* | 7/2018 | Zhao | ................... | G06F 16/7335 |
| 10,171,768 B2* | 1/2019 | Rakshit | ................... | G06F 3/013 |
| 10,262,343 B1* | 4/2019 | Orekhov | ................. | G06F 21/51 |
| 10,771,824 B1* | 9/2020 | Haritaoglu | ......... | H04N 21/6373 |
| 10,885,091 B1* | 1/2021 | Meng | ................ | G06F 16/24578 |
| 11,107,010 B2* | 8/2021 | Fontebride | ............ | G06Q 10/02 |
| 2004/0177110 A1* | 9/2004 | Rounthwaite | ........... | H04L 51/12 709/202 |
| 2004/0215977 A1* | 10/2004 | Goodman | ............... | H04L 51/12 726/22 |
| 2005/0022008 A1* | 1/2005 | Goodman | ............... | H04L 51/12 726/4 |
| 2005/0193073 A1* | 9/2005 | Mehr | ...................... | H04L 51/12 709/224 |
| 2007/0208751 A1* | 9/2007 | Cowan | .................... | G06Q 30/02 |
| 2013/0124328 A1* | 5/2013 | Broadhead | ......... | G06Q 30/0269 705/14.66 |
| 2014/0081992 A1* | 3/2014 | Peterson | ............... | G06F 16/437 707/758 |
| 2015/0046832 A1* | 2/2015 | George | .................. | G06F 9/4856 715/744 |
| 2016/0373794 A1* | 12/2016 | Heitlinger | .......... | H04N 21/2541 |
| 2017/0034569 A1* | 2/2017 | Rasool | ............... | H04N 21/4312 |
| 2019/0132629 A1* | 5/2019 | Kendrick | ........... | H04N 21/4532 |
| 2019/0230091 A1* | 7/2019 | Marlin | .................. | H04L 63/102 |

* cited by examiner

*Primary Examiner* — Tauqir Hussain
(74) *Attorney, Agent, or Firm* — Zilka-Kotab, P.C.

(57) ABSTRACT

A system, method, and computer program product are provided for parental controls and recommendations based on artificial intelligence. In use, using an artificial intelligence (AI) server, explicit input is received associated with a first presentation of media. Additionally, the AI server is trained based on the explicit input, and using the AI server, implicit filters are created based on the training. Further, using the AI server, the implicit filters are applied to a second presentation of the media.

20 Claims, 6 Drawing Sheets

SYSTEM, METHOD, AND COMPUTER PROGRAM FOR PARENTAL CONTROLS AND RECOMMENDATIONS BASED ON ARTIFICIAL INTELLIGENCE

FIELD OF THE INVENTION

The present invention relates to parental controls, and more particularly to parent controls and recommendations based on artificial intelligence (AI).

BACKGROUND

Filtering media can be a painstaking process. As a simple example, parents that wish to filter their media library to only children-appropriate media must do so file by file, or media item by media item. As the complexity and number of media items increase, the amount of time that must be dedicated to manually filtering the media library increases as well. Further, such filtering may be limited to organizing media items into one grouping (e.g., children-appropriate videos) and another grouping (e.g., all other videos). Such filtering and organization therefore remain static until further manual input is received. Additionally, having personalized filtering (e.g., profile log in information) may allow for filtering based on metadata (rather than static organization of media files). However, such personalized filtering is again based on manual construction which remains static.

As such, there is thus a need for addressing these and/or other issues associated with the prior art.

SUMMARY

A system, method, and computer program product are provided for parental controls and recommendations based on artificial intelligence. In use, using an artificial intelligence (AI) server, explicit input is received associated with a first presentation of media. Additionally, the AI server is trained based on the explicit input, and using the AI server, implicit filters are created based on the training. Further, using the AI server, the implicit filters are applied to a second presentation of the media.

DETAILED DESCRIPTION

Figure 1:
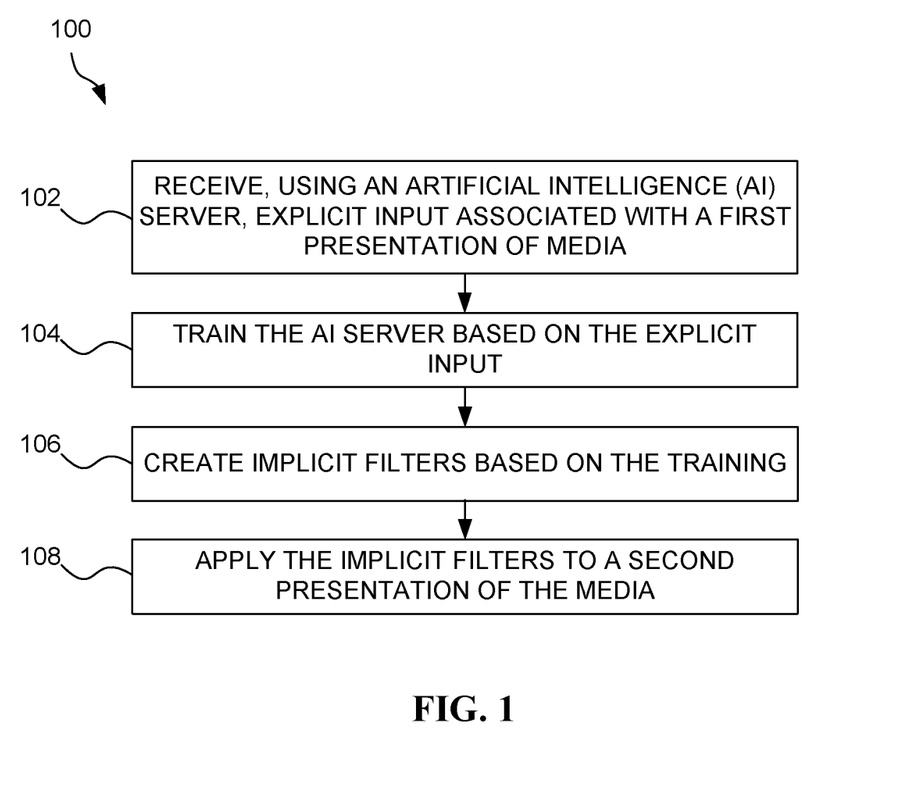
FIG. 1 illustrates a method for applying implicit filters, in accordance with one embodiment.

FIG. 1 illustrates a method 100 for applying implicit filters, in accordance with one embodiment.

As shown, using an artificial intelligence (AI) server, explicit input associated with a first presentation of media is received. See operation 102. In the context of the present description, an AI server may refer to a computing device upon which the computer program product executes commands to perform AI functions. In the context of the present description, an explicit input may refer to any input received from or controlled by a user. For example, the explicit input may include a parental control-based user input designed to prevent certain types of media content from being viewed by children like a classification and/or a setting. In one embodiment, the media may include at least one of: a movie, a television show, a music file, a video file, or an image file.

In one embodiment, the explicit input may include at least one of a media preference, a media type, a media rating, a media year, a media genre, a media company, or a media language. Additionally, the explicit input may include data based on a user relationship, and the user relationship may include a connection between a first user and at least one of: a second user, a third party, a content producer, or an online media source. For example, the user relationship may include a social connection between a first user and a second user, and the explicit input may include a recommendation given for a media which is liked or otherwise flagged in some manner by the first user.

Further, the explicit input may include metadata. In one embodiment, the metadata may include at least one of genre, title, year, release date, critic rating, content rating, duration, progress, plays, date added, date viewed, resolution, bitrate, director, actor, actress, writer, producer, country, or studio. Additionally, the explicit input may include parental controls. Further, the parental controls may be used to set an appropriate age-limit for the media. For example, the age-limit may be based on an actual age of an individual (e.g., 12, 13, 14, etc.), an age group (e.g., 2-4, 10-12, 14-16, etc.), etc. As such, the explicit input may include an age.

In yet another embodiment, the explicit input may include a type associated with the media, and the type may include at least one of: a critic rating, a user rating, a parent-approved certification, an award, or a user approval.

Additionally, the AI server is trained based on the explicit input. See operation 104. In the context of the present description, the term "trained" may refer to using data to cause an AI server to formulate AI models to analyze media. In one embodiment, the AI system may receive explicit input from one or more users. In one embodiment, the AI system may create labels and/or tags based on the explicit input, and the labels and/or tags may be used by the AI server for training.

Furthermore, implicit filters are created based on the training. See operation 106. In the context of the present description, an implicit filter may refer to a classification and/or a setting automatically applied to a media type based on the AI server. In one embodiment, the AI server may create the implicit filters based on having been trained to apply a classification and/or setting due to a previous explicit input specified by a user. In one embodiment, a personalized customer experience may be created based on the implicit filters. For example, a presentation of the media may change based on a user accessing the media. Additionally, time of day considerations (e.g., morning versus evening, etc.) may be used by the AI server to present more time-aware pertinent media. For example, an individual may be more interested in receiving local news in the morning, international news in the late afternoon, and a movie selection in the evening.

In addition, the implicit filters are applied to a second presentation of the media. See operation 108. In one embodiment, the second presentation of the media may be a subset of the first presentation of media.

As an example, the media may include presentation of multiple movies. The explicit input may include filtering by a user of the movies that are not relevant or of interest to the user. Based on the explicit input, the AI server may create implicit filters to more accurately present content that is of interest to the user. In one embodiment, the media presented may include media on a home media server (e.g., owned locally), on a cloud based system, and/or may include a license to access media (e.g., Amazon Prime, Netflix, etc.).

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
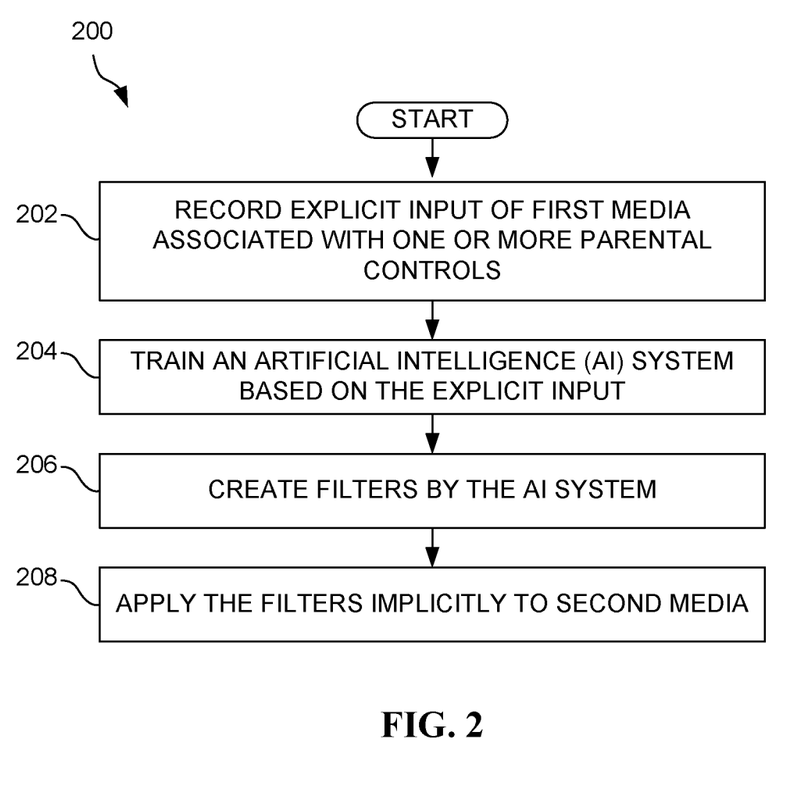
FIG. 2 illustrates a method for applying filters implicitly, in accordance with one embodiment.

FIG. 2 illustrates a method 200 for applying filters implicitly, in accordance with one embodiment. As an option, the method 200 may be implemented in the context of any one or more of the embodiments set forth in any previous and/or subsequent figure(s) and/or description thereof. Of course, however, the method 200 may be implemented in the context of any desired environment. Further, the aforementioned definitions may equally apply to the description below.

As shown, explicit input of first media associated with one or more parental controls is recorded. See operation 202. In one embodiment, the explicit input may take the form of the AI server receiving explicit input from one or more users entering parental control settings, such as highlighting language, an adult scene, scenes of violence, and/or emotional scenes, that ultimately translate into labels later used to train the AI server from which implicit filters can then be applied.

Additionally, an artificial intelligence (AI) system is trained based on the explicit input. See operation 204. In one embodiment, the AI server may be trained by creating labels based on the explicit input, training the AI system using the labels, creating a user-specific set of filters, determining an identity of a first user, and/or selecting a user-specific set of filters associated with the first user. It should be noted that the training of the AI system may take place by the AI server receiving explicit input from one or more users entering parental control settings and retaining those classifications and/or settings so that the classifications and/or settings may be applied to other similar (or dissimilar) media in the future based on matching and/or approximating similar language, violence, and/or other highlighted media content.

Further, filters are created by the AI system. See operation 206. In one embodiment, based on the training, the AI system may automatically create implicit filters in the form of one or more labels to apply to other media available for viewing by the user according to a service level and/or subscription.

In addition, the filters are applied implicitly to second media. See operation 208. In one embodiment, after the user settings have been specified, the AI system may retain the explicit input and associated media type in the AI server data repository for future recollection and application to another media content.

Figure 3:
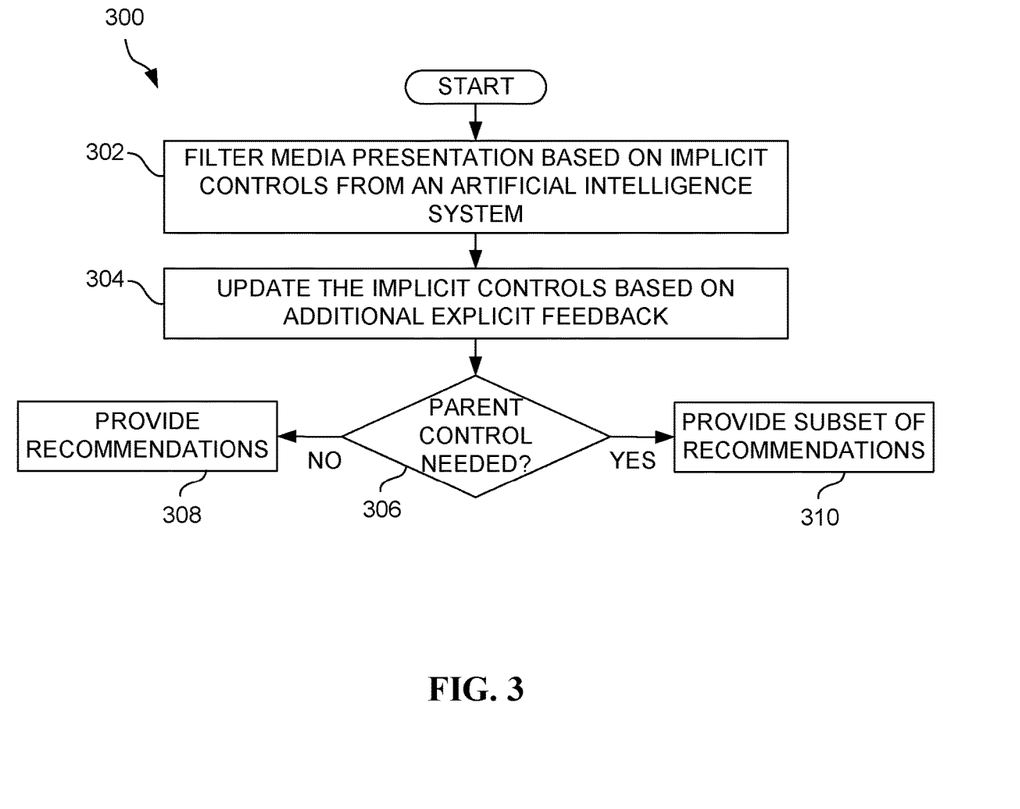
FIG. 3 illustrates a method for providing recommendations, in accordance with one embodiment.

FIG. 3 illustrates method 300 for providing recommendations, in accordance with one embodiment. As an option, the method 300 may be implemented in the context of any one or more of the embodiments set forth in any previous and/or subsequent figure(s) and/or description thereof. Of course, however, the method 300 may be implemented in the context of any desired environment. Further, the aforementioned definitions may equally apply to the description below.

As shown, media presentation is filtered based on implicit controls from an artificial intelligence system. See operation 302. In one embodiment, the AI system may automatically create a filter for the media presentation. For example, a child-appropriate filter may include muting and/or otherwise obscuring flagged content according to specified parental controls. As discussed herein, the filtering may be based on explicit input which is used to train the AI system.

Additionally, the implicit controls are updated based on additional explicit feedback. See operation 304. In one embodiment, additional explicit input may be received, and the additional explicit input may be used to update the implicit filters. In another embodiment, a first input may be received to override the second presentation of the media to present an alternative presentation. It should be noted that, with the addition of subsequent explicit feedback, the system may alter and/or augment the current AI system training for labels that may be automatically applied to the presentation of media based on users' further explicit input.

For example, a parent may be viewing a collection of movies with their child, and may determine that the level of action in a first movie is too intense for their child. Thus, the parent may provide additional explicit feedback to indicate that such movie is too intense for the child, and the AI system may use such feedback to further train the AI system to also filter out other movies of similar intensity type.

Further, it is determined whether a parental control is needed. See decision 306. If no parental control is needed, then recommendations are provided. See operation 308. If parental control is needed, then a subset of recommendations is provided. See operation 310. In one embodiment, the decision 306 may be used to determine whether parental control (based on the explicit input and the created implicit filters) is needed. For example, based on the explicit input and the additional explicit feedback, the AI system may be in a position to implicitly filter the presentation of media. However, it may be desired to apply such implicit filters only when children are also viewing the presentation of the media. Thus, the decision 306 may be used to decide whether to apply the implicit filters or not. As such, in one embodiment, it may be determined whether the implicit filters are matched to the current user using the presentation of the media system.

Additionally, the subset of recommendations (per operation 310) may refer to a presentation where implicit filters have been applied in combination with an age-limit, whereas the recommendations (per operation 308) may refer to a presentation where implicit filters have been applied but where no age-limit filters and/or restrictions are used.

Figure 4:
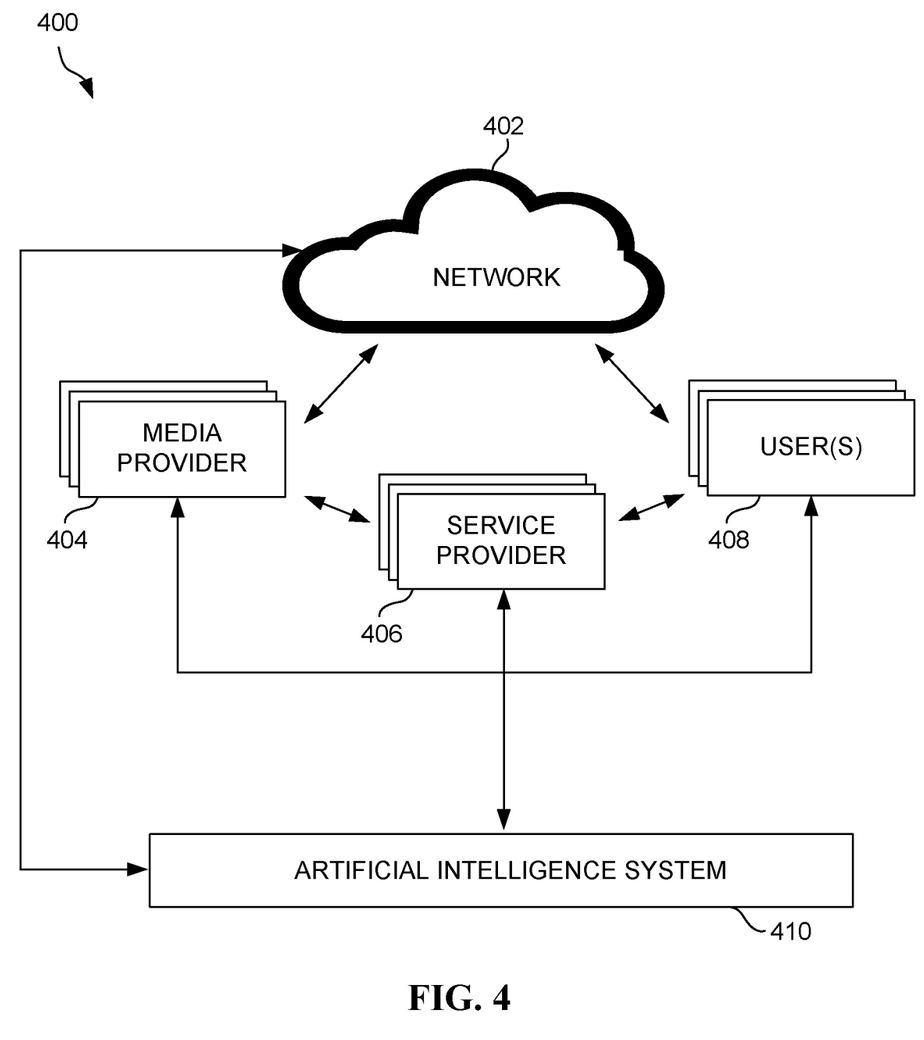
FIG. 4 illustrates a system for applying implicit filters, in accordance with one embodiment.

FIG. 4 illustrates a system 400 for applying implicit filters, in accordance with one embodiment. As an option, the system 400 may be implemented in the context of any one or more of the embodiments set forth in any previous and/or subsequent figure(s) and/or description thereof. Of course, however, the system 400 may be implemented in the context of any desired environment. Further, the aforementioned definitions may equally apply to the description below.

In operation, a communications network 402 is communicatively coupled to an artificial intelligence (AI) system 410, to users 408, and to one or more media providers 404 so that the AI system may receive explicit user input in the form of parental controls associated with a first media type (and other subsequent media types) where the explicit input has the effect of training the AI system to later apply one or more implicit filters to other media available from the media providers 404, service providers 406, and/or the user(s) 408.

Additionally, in one embodiment, the users 408 may be connected to the media providers 406 directly, via one or more service providers 406, and via the communications network 402.

Further, in one embodiment, the one or more service providers may be communicatively connected to the artificial intelligence (AI) system 410 where an AI server may develop implicit filters which may be applied to the media types available to users 408 from the media providers 404 and/or service providers 406.

Figure 5:
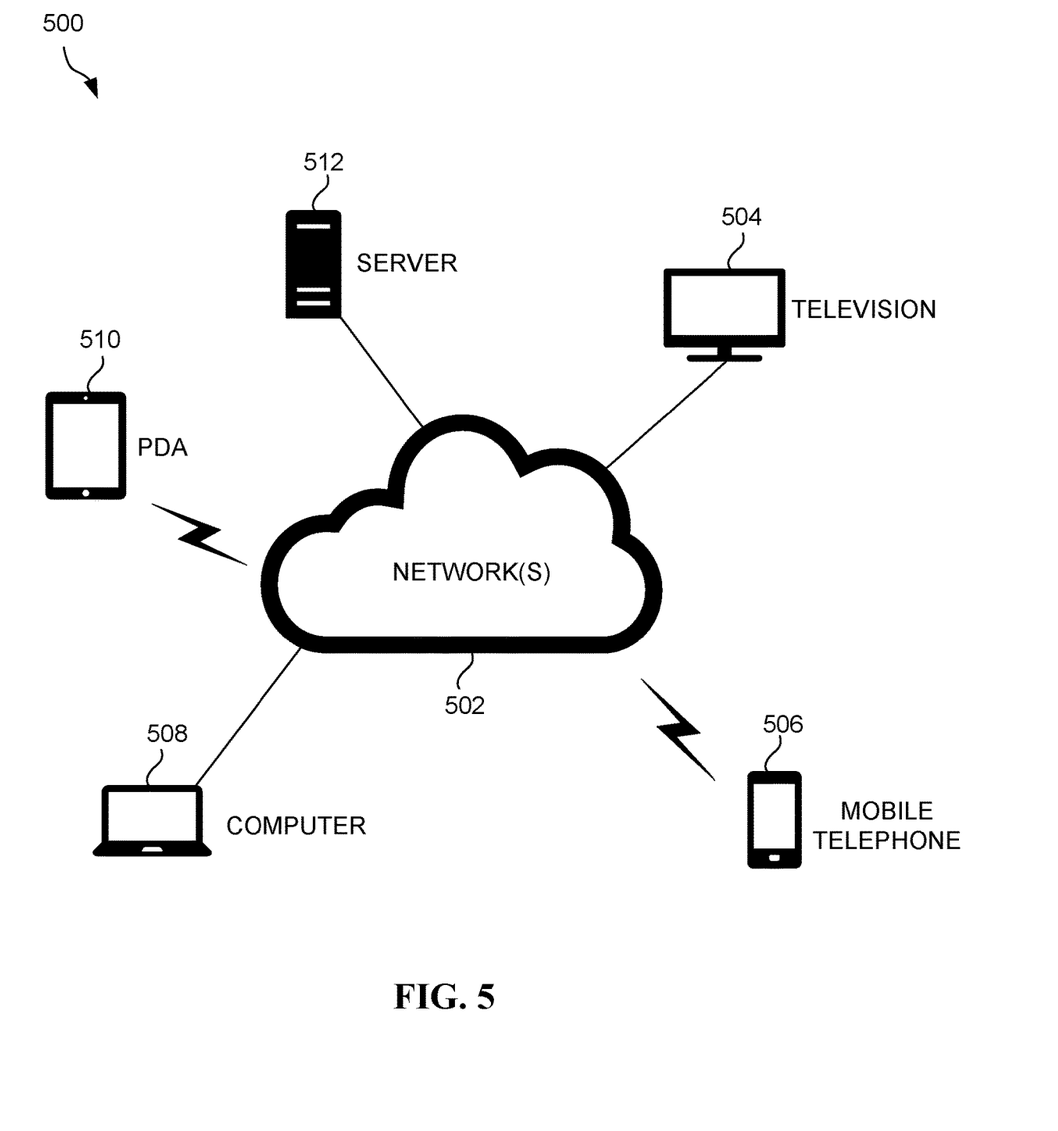
FIG. 5 illustrates a network architecture, in accordance with one possible embodiment.

FIG. 5 illustrates a network architecture 500, in accordance with one possible embodiment. As shown, at least one network 502 is provided. In the context of the present network architecture 500, the network 502 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 502 may be provided.

Coupled to the network 502 is a plurality of devices. For example, a server computer 512 and an end user computer 508 may be coupled to the network 502 for communication purposes. Such end user computer 508 may include a desktop computer, lap-top computer, and/or any other type of logic. Still yet, various other devices may be coupled to the network 502 including a personal digital assistant (PDA) device 510, a mobile phone device 506, a television 504, etc.

Figure 6:
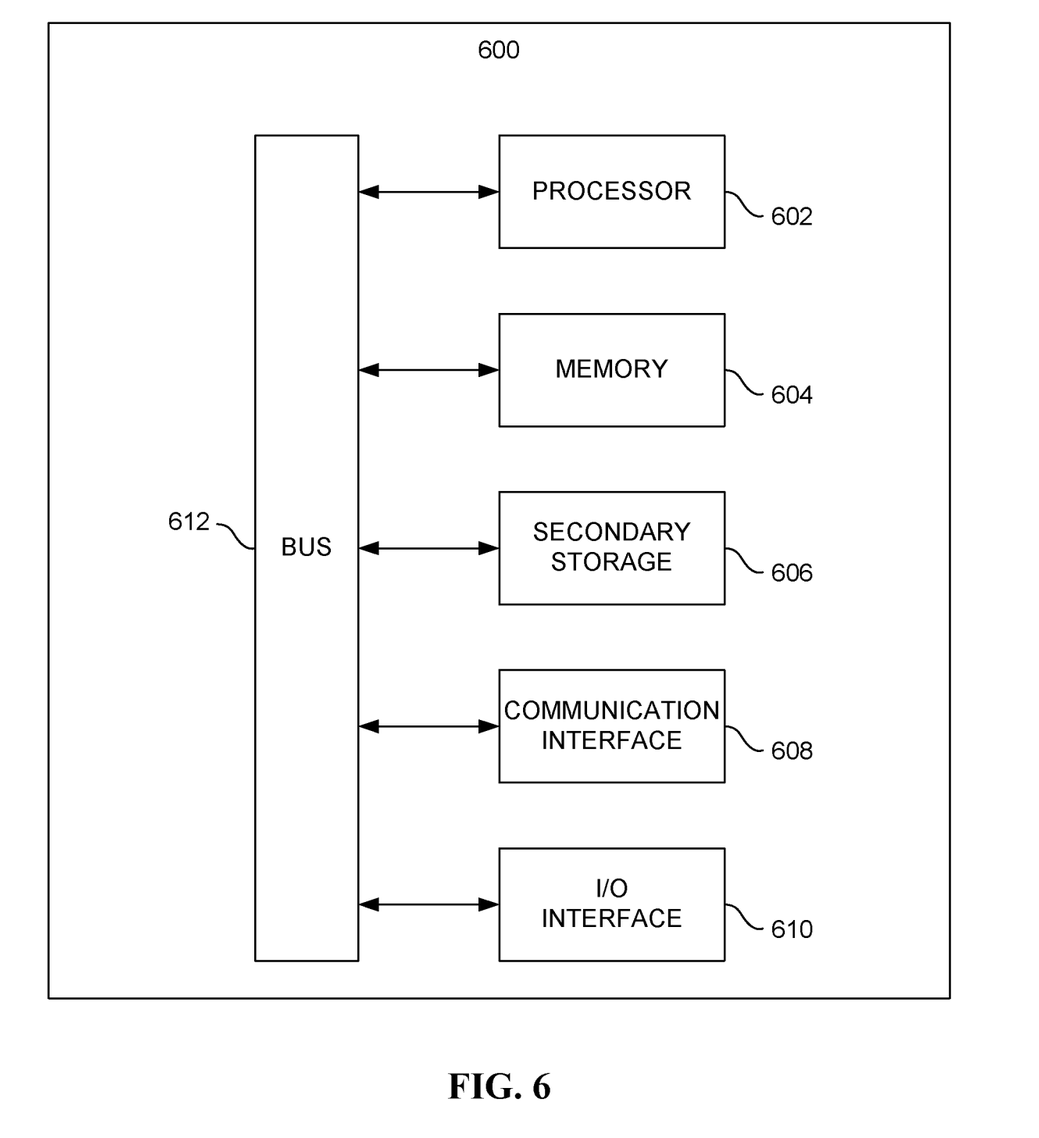
FIG. 6 illustrates an exemplary system, in accordance with one embodiment.

FIG. 6 illustrates an exemplary system 600, in accordance with one embodiment. As an option, the system 600 may be implemented in the context of any of the devices of the network architecture 500 of FIG. 5. Of course, the system 600 may be implemented in any desired environment.

As shown, a system 600 is provided including at least one central processor 602 which is connected to a communication bus 612. The system 600 also includes main memory 604 [e.g. random access memory (RAM), etc.]. The system 600 also includes a graphics processor 608 and a display 610.

The system 600 may also include a secondary storage 606. The secondary storage 606 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 604, the secondary storage 606, and/or any other memory, for that matter. Such computer programs, when executed, enable the system 600 to perform various functions (as set forth above, for example). Memory 604, storage 606 and/or any other storage are possible examples of non-transitory computer-readable media. It is noted that the techniques described herein, in an aspect, are embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media are included which may store data that is accessible by a computer, such as magnetic cassettes, flash memory cards, digital video disks, Bernoulli cartridges, random access memory (RAM), read-only memory (ROM), and the like.

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that various of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. A computer program product comprising computer executable instructions stored on a non-transitory computer readable medium that when executed by a processor instruct the processor to:
   receive, at an artificial intelligence (AI) server, explicit input from a user associated with a first presentation of media, the explicit input being explicit parental control settings that highlight one or more features of the media presented during the first presentation;
   create labels for the one or more features of the media highlighted by the explicit parent control settings received from the user;
   train the AI server using the labels created for the one or more features of the media;
   create implicit filters based on the training, the implicit filters being implicit parental control settings learned from the training of the AI server;
   apply the implicit filters to a second presentation of the media to filter the second presentation of the media according to the implicit parental control settings, wherein filtering the second presentation includes at least one of muting flagged content according to the implicit parental control settings or obscuring flagged content according to the implicit parental control settings.

2. The computer program product of claim 1, wherein the explicit input includes a user relationship.

3. The computer program product of claim 2, wherein the user relationship includes a connection between the user and another user.

4. The computer program product of claim 1, wherein the media includes at least one of movies provided by at least one media provider or television shows provided by the at least one media provider.

5. The computer program product of claim 1, wherein the explicit input includes metadata.

6. The computer program product of claim 5, wherein the metadata includes at least one of genre, title, year, release date, critic rating, content rating, duration, progress, plays, date added, date viewed, resolution, bitrate, director, actor, actress, writer, producer, country, or studio.

7. The computer program product of claim 1, wherein the explicit parent control settings and the implicit parental control settings are used to set an appropriate age-limit for the media.

8. The computer program product of claim 1, wherein the explicit input includes an age.

9. The computer program product of claim 1, wherein the computer program product is configured to receive additional explicit input.

10. The computer program product of claim 9, wherein the additional explicit input is used to update the implicit filters.

11. The computer program product of claim 1, wherein the computer program product is configured to receive a first input to override the second presentation of the media to present an alternative presentation.

12. A method, comprising:
    receiving, using an artificial intelligence (AI) server, explicit input associated with a first presentation of media, the explicit input being explicit parental control settings that highlight one or more features of the media presented during the first presentation;
    creating, using the AI server, labels for the one or more features of the media highlighted by the explicit parent control settings received from the user;
    training the AI server using the labels created for the one or more features of the media;
    creating, using the AI server, implicit filters based on the training, the implicit filters being implicit parental control settings learned from the training of the AI server;
    applying, using the AI server, the implicit filters to a second presentation of the media to filter the second presentation of the media according to the implicit parental control settings, wherein filtering the second presentation includes at least one of muting flagged content according to the implicit parental control settings or obscuring flagged content according to the implicit parental control settings.

13. A device, comprising:

a non-transitory memory storing instructions; and one or more processors in communication with the non-transitory memory, wherein the one or more processors execute the instructions to:

receive, at an artificial intelligence (AI) server, explicit input from a user associated with a first presentation of media, the explicit input being explicit parental control settings that highlight one or more features of the media presented during the first presentation;

create labels for the one or more features of the media highlighted by the explicit parent control settings received from the user;

train the AI server using the labels created for the one or more features of the media;

create implicit filters based on the training, the implicit filters being implicit parental control settings learned from the training of the AI server;

apply the implicit filters to a second presentation of the media to filter the second presentation of the media according to the implicit parental control settings, wherein filtering the second presentation includes at least one of muting flagged content according to the implicit parental control settings or obscuring flagged content according to the implicit parental control settings.

14. The computer program product of claim 1, wherein the explicit parental control settings are designed to prevent certain types of media content from being viewed by children.

15. The computer program product of claim 14, wherein the certain types of media content include media content having the one or more features of the media highlighted by the explicit parent control settings received from the user.

16. The computer program product of claim 1, wherein the one or more features of the media highlighted by the explicit parent control settings received from the user include a language.

17. The computer program product of claim 1, wherein the one or more features of the media highlighted by the explicit parent control settings received from the user include an adult scene.

18. The computer program product of claim 1, wherein the one or more features of the media highlighted by the explicit parent control settings received from the user include a scene of violence.

19. The computer program product of claim 1, wherein filtering the second presentation includes muting flagged content according to the implicit parental control settings.

20. The computer program product of claim 1, wherein filtering the second presentation includes obscuring flagged content according to the implicit parental control settings.

* * * * *